(12) United States Patent
Ulrich et al.

(10) Patent No.: US 7,474,462 B2
(45) Date of Patent: Jan. 6, 2009

(54) MICROSCOPE WITH EVANESCENT WAVE ILLUMINATION

(75) Inventors: Heinrich Ulrich, Heidelberg (DE); Werner Knebel, Kronau (DE); Kyra Moellmann, Trippstadt (DE); Juergen Hoffmann, Eppstein-Niederjosbach (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 188 days.

(21) Appl. No.: 11/415,254

(22) Filed: May 1, 2006

(65) Prior Publication Data

US 2007/0159690 A1  Jul. 12, 2007

Related U.S. Application Data

(63) Continuation of application No. PCT/EP2004/052293, filed on Sep. 23, 2004.

(30) Foreign Application Priority Data

Sep. 25, 2003 (DE) ................... 103 44 410
Sep. 10, 2004 (DE) ............. 10 2004 044 310

(51) Int. Cl.
   *G02B 21/06* (2006.01)
(52) U.S. Cl. ..................................... 359/385
(58) Field of Classification Search ................. 359/385, 359/368
   See application file for complete search history.

(56) References Cited

U.S. PATENT DOCUMENTS

| 4,405,237 | A |   | 9/1983 | Manuccia et al. |
| 5,675,145 | A | * | 10/1997 | Toda et al. ................. 250/234 |
| 5,731,588 | A |   | 3/1998 | Hell et al. |
| 6,094,300 | A | * | 7/2000 | Kashima et al. ............. 359/385 |
| 6,108,081 | A | * | 8/2000 | Holtom et al. .............. 356/301 |
| 6,504,653 | B2 |   | 1/2003 | Matthae et al. |
| 6,667,830 | B1 |   | 12/2003 | Iketaki et al. |
| 6,809,814 | B2 | * | 10/2004 | Xie et al. ..................... 356/301 |
| 6,987,609 | B2 |   | 1/2006 | Tischer et al. |

(Continued)

FOREIGN PATENT DOCUMENTS

DE    101 08 796 A1    9/2002

(Continued)

OTHER PUBLICATIONS

Chon, J.W.M. et al., Scanning total internal reflection fluorescence microscopy under one-photon . . . Applied Optics, 2004, pp. 1063-1071, v.43, Optical Society of America, USA.

(Continued)

*Primary Examiner*—Arnel C Lavarias
*Assistant Examiner*—Mark Consilvio
(74) *Attorney, Agent, or Firm*—Houston Eliseeva LLP

(57) ABSTRACT

A microscope with a first and a second illumination light beam for illuminating a sample, wherein the first and/or the second illumination light beam evanescently illuminates the sample. For the purpose of CARS testing, the first illumination light beam can be a pump light beam, and the second illumination light beam can be a Stokes light beam. To increase resolution, the first illumination light beam can be an excitation light beam, and the second illumination light beam can be a stimulation light beam.

20 Claims, 2 Drawing Sheets

U.S. PATENT DOCUMENTS

| | | |
|---|---|---|
| 7,042,638 B2 | 5/2006 | Gonschor et al. |
| 7,092,086 B2 * | 8/2006 | Knebel ..................... 356/301 |
| 2002/0097489 A1 | 7/2002 | Kawano et al. |
| 2002/0167724 A1 | 11/2002 | Iketaki et al. |
| 2004/0001253 A1 | 1/2004 | Abe et al. |
| 2004/0178334 A1 * | 9/2004 | Sasaki ..................... 250/234 |

FOREIGN PATENT DOCUMENTS

| | | |
|---|---|---|
| DE | 101 43 481 A1 | 3/2003 |
| DE | 102 17 098 A1 | 11/2003 |
| DE | 102 29 935 A1 | 1/2004 |
| JP | 09159922 A * | 6/1997 |
| JP | 2003307682 A * | 10/2003 |
| WO | PCT/DE/95/00124 | 2/1995 |

OTHER PUBLICATIONS

Oheim, M. et al. Multiparameter evanescent-wave imaging in biological fluorescence microscopy. IEEE Journal of Quantum Electronics, Feb. 2, 2002, pp. 142-148, v.38, n.2, IEEE, USA.

Schapper, F. et al. Fluorescence imaging with two-photon evanescent wave excitation. European Biophysical Journal, Sep. 3, 2003, pp. 635-643, v.32, Springer Berlin, Germany.

* cited by examiner

MICROSCOPE WITH EVANESCENT WAVE ILLUMINATION

RELATED APPLICATIONS

This application is a Continuation of PCT application serial number PCT/EP2004/052293 filed on Sep. 23, 2004 which in turn claims priority to German application serial number DE 103 44 410.6 filed on Sep. 25, 2003 and German application serial number DE 10 2004 044 310.6 filed on Sep. 10, 2004, both of which are incorporated herein by reference in their entirety.

FIELD OF THE INVENTION

The invention relates to a microscope with a first and a second illumination light beam for illuminating a sample.

The invention further relates to a method for testing a sample, in particular microscopically.

BACKGROUND OF THE INVENTION

A microscope with evanescent illumination of a sample is known from US 2002/0097489 A1. The microscope comprises a white light source, the light of which is coupled for the purpose of evanescent illumination via a slit aperture through the microscope objective onto a sample holder, which holds a sample. The illumination light propagates itself in the sample holder by means of total internal reflection, whereby the illumination of the sample occurs only in the region of the evanescent field that protrudes from the sample holder. Microscopes of this type are known as "total internal reflection fluorescent microscopes" (TIRFM).

The z-resolution of TIRF microscopes is extraordinarily good because the evanescent field protrudes only about 100 nm into the sample.

A high-aperture objective specifically for TIRF application is known from DE 101 08 796 A1. The objective comprises a first lens with positive refractive power and a second lens with negative refractive power, whereby the focal distance ratio between the two lenses is in the −0.4 and −0.1 range, and the total refractive power is greater than zero. The objective further comprises two positive lenses, the diameter ratio to focal length of which is greater than 0.3 and less than 0.6. The objective further comprises a negative lens and a collecting lens, whereby the negative lens faces the front group, and the focal distance ratio of the negative lens to the collector lens is between −0.5 and −2.

An incident illumination device for TIRF microscopy is known from DE 102 17 098 A1. The incident illumination device comprises an illumination source that emits a polarized illumination beam when in operation, which propagates at an angle to the optical axis and a deflector that deflects the illumination light beam and couples it parallel to the optical axis in the objective. Provision is made in this incident illumination device for the illumination light beam emitted by the illumination source to exhibit a phase difference in the s- and p-polarization directions, and for the deflection arrangement to reflect the illumination light beam x times, whereby $x=(n \times 180°-d)/60°$.

A microscope for total internal reflection microscopy (TIRM) is known from DE 101 43 481 A1. The microscope exhibits a microscope housing and an objective. The illumination light emitted by an illumination device can be coupled via an adapter that can be inserted into the microscope housing.

A microscope with an optical illumination system that enables simple switching between evanescent illumination and reflective illumination is known from US 2004/0001253 A1. The illumination system comprises a laser light source, the light of which is coupled in an optical fiber. Furthermore, an outcoupling optic is provided that focuses the light that exits from the fiber onto a rear focal point of the microscope objective. The optical fiber is movable along a plane that is perpendicular to the optical axis of the microscope objective.

A device for coupling light in a microscope is known from DE 102 29 935 A1. Here, a laser light is directed onto a sample in the illuminated field diaphragm plane by a laser light fiber coupling, which is implemented as a slide. The invention is particularly suitable for the TIRF method.

In scanning microscopy, a sample is illuminated with a light beam to observe the detection light emitted by the sample as reflection or fluorescent light. The focus of an illumination light beam is moved on an object plane with the help of a movable beam deflector, generally by tipping two mirrors, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors. In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection light or fluorescent light. The illumination light is coupled via a beam splitter. The fluorescent light or reflected light emitted by the object returns to the beam splitter via the beam deflector, passes through it, and is subsequently focused onto the detection aperture, behind which are located the detectors. This arrangement of detectors is called a descan arrangement. Detection light that does not originate directly from the focal region takes another light path and does not pass through the detection aperture so that pixel information is obtained, which is converted into a three-dimensional image by sequential scanning of the object with the focus of the illumination light beam. A 3-dimensional image is generally achieved by layered imaging.

Arrangements that increase the resolving power of a confocal scanning microscope are, among other things, given by the intensity distribution and the spatial expansion/extent/extension of the focus of the excitation light beam. An arrangement for increasing the resolving power for fluorescence applications is known from PCT/DE/95/00124. Here, the lateral peripheral areas of the focus volume of the excitation light beam are illuminated with a light beam of a different wavelength, the so-called stimulation light beam, which is emitted from a second laser, in order to return the sample areas stimulated there by the light of the first laser to their normal state. Only the light emitted spontaneously from the areas not illuminated by the second laser is detected so that an overall improvement in resolution is achieved. This method is known as STED (stimulated emission depletion).

For example, a variant of the STED method is known from US 2002/0167724 A1 and from US 6,667,830 B1, in which the sample areas that are excited by the light from the first laser are next excited by the light of the second laser—into a third state. In this variant, known as "up-conversion,"

increases in resolution are achieved equivalent to those achieved by the variant with directly stimulated de-excitation to the normal state.

Coherent anti-Stokes Raman (CARS) microscopy is an art that is gaining in importance. One great advantage is that the samples do not need to be marked with dyes. Furthermore, living cells may be tested.

In comparison with conventional Raman microscopy and known confocal Raman microscopy, CARS microscopy makes it possible to achieve higher detection light yield, better suppression of interference, and greater ability to separate detection light from illumination light. A detection pinhole and a high-resolution spectrometer are needed in conventional confocal Raman spectroscopy in order to achieve good axial resolution. CARS, by contrast, is a nonlinear optical process (four-wave mixing process). In a manner similar to multi-photon microscopy, in which two or more photons are absorbed simultaneously, no detection pinhole is needed because the probability of in-phase simultaneous convergence of several photons in the focus is at its greatest because of the high photon density. The same axial resolution as with multi-photon microscopy is achieved without a detection pinhole. In CARS spectroscopy, 2 lasers that emit light at different wavelengths are usually used ($v_P$ and $v_S$, Pump and Stokes laser), whereby $v_S$ should be tunable in order to produce ($v_{CARS}=2v_P-v_S$, $I_{CARS}\sim(I_P)^2 \cdot I_S$) a CARS spectrum $v_{CARS}$. If the difference frequency $v_P-v_S$ agrees with the difference frequency between two molecular vibration states |1⟩ and |0⟩ in the sample, the CARS signal is actually strengthened. The pump light beam and the Stokes light beam are coaxially combined in microscopic applications and are together focused on the same sample volume. The direction in which the anti-Stokes beam is emitted results from the phase-matching condition for the four-wave mixing process.

A device is known from U.S. patent application Ser. No. 4,405,237, "Coherent anti-Stokes Raman device," in which two pulsed laser beams, which are produced by two lasers, and which exhibit different wavelengths in the visible region or in the UV region of the spectrum, are used to illuminate a sample simultaneously. With appropriate wavelength selection, the sample may be excited such that it emits the characteristic coherent anti-Stokes Raman beam.

A method for exciting an evanescently illuminated sample using a two-photon process is known from James W. M. Chon, Min Gu, "Scanning total internal reflection fluorescence microscopy under one-photon and two-photon excitation: Image formation," Appl. Opt. 43, 1063-1071, 2004, and from Florian Schapper, José T. Gonçalves, Martin Oheim, "Fluorescence imaging with two-photon evanescent wave excitation," Eur. Biophys. J. 32, 635-643, 2003.

The previous art for evanescent sample illumination merely enables the testing of sample layers that directly adjoin the cover glass or the sample holder.

SUMMARY OF THE INVENTION

The task of the present invention is to disclose a microscope that largely enables flexible sample testing, in particular of areas that do not directly adjoin the cover glass or the sample holder.

This task is solved by a microscope wherein the first and/or the second illumination light beam illuminate the sample evanescently.

A further task of the present invention is to disclose a method—in particular a scanning microscopic method—for testing a sample, which is largely flexible and is not limited to sample layers that directly adjoin the cover glass or the sample holder.

The further task is solved by a method wherein a sample is tested—in particular, microscopically—with the following steps:

production of a first and a second illumination light beam;

illumination of the sample with the first and the second illumination light beam, whereby at least the first illumination light beam evanescently illuminates the sample.

In a particularly preferred embodiment, the microscope exhibits an objective with an objective pupil, whereby the first and/or the second illumination light beam exhibits a focus in the area of the objective pupil. Preferably, an adjustment mechanism is provided with which the spatial position of the focus within the plane of the objective pupil may be changed. For this purpose, an adjustment mechanism may be provided with which the spatial position of the focus within the objective pupil plane may be changed. The adjustment mechanism may, for example, comprise a beam deflector with several rotating or wing mirrors, or a cardanically suspended mirror. The adjustment mechanism may also be implemented as an acousto-optical element, or may comprise a micromirror. A movable light-conducting fiber may also be used to adjust the spatial position of the focus of the illumination light beam.

The angle to the optical axis of the objective at which the illumination light beam, which is provided for evanescent illumination of the sample, exits the objective depends on the spatial position of the focus in the objective pupil. The greater the distance of the focus to the optical axis, the greater the angle. Therefore, according to the invention, the distance of the focus to the optical axis of the objective in particular is adjustable, and therewith also the penetration depth of the evanescent field in the sample.

In a preferred embodiment of the scanning microscope according to the invention, in order to accomplish CARS testing of a sample, the first illumination light beam is a pump light beam and the second illumination light beam is a Stokes light beam.

In a further, very preferred embodiment of the scanning microscope according to the invention, in order to achieve high local resolution, the first illumination light beam is an excitation light beam for optical excitation of a first sample area, and the second illumination light beam is a stimulation light beam to trigger stimulated emission or to trigger further excitation, whereby the stimulated emission and/or the further excitation occurs in a further sample area that at least partially overlaps with the first sample area.

Particularly preferred is a variant in which the excitation light beam and the stimulation light beam both evanescently illuminate the sample, whereby the excitation light beam exhibits greater penetration depth than does the stimulation light beam. In order to achieve this, a distance of the focus of the excitation light beam in the objective pupil to the optical axis of the objective is selected that is greater than the distance of the focus of the stimulation light beam in the objective pupil to the optical axis. As a result of the relatively deeper penetration of the excitation light beam, the sample is optically excited over a relatively broad layer that adjoins the cover glass or the sample holder, and optically stimulated by the stimulation light beam over a relatively narrower layer that overlaps the first layer and adjoins the sample holder or the cover glass, and optically de-excited so that in the end only fluorescence photons are largely detected from the part of the layer illuminated with the excitation light beam that is not spatially overlapped by the layer that is illuminated by the stimulation light beam.

In another variant according to the invention, the sample is evanescently illuminated by the excitation light beam and directly optically de-excited when optically stimulated by the directly illuminated stimulation light beam. In the process, the stimulation light beam preferably manipulated such that the focus of the stimulation light beam is hollow inside. A hollow focus may be formed, for example, with the help of phase filters that are arranged in a conjugated plane (Fourier plane) to the focal plane of the objective. A λ/2 plate that is over-illuminated by the stimulation light beam may, for example, function as the phase filter so that only the partial inner area of the stimulation light beam passes through the λ/2 plate, while the outer ring passes by the λ/2 plate. The fluorescence photons that emanate from the partial area of the sample, which is evanescently illuminated by the excitation light beam and which lies within the interior of the hollow focus of the stimulation light beam, are detected last. In this manner, the sample may be scanned with very high local resolution. The local resolution in the z-direction is determined by the penetration depth of the evanescently illuminated excitation light beam (e.g., 100 nm), while the resolving power in the axial directions are determined by the dimensions of the hollow focus. To scan the sample, the focus of the stimulation light beam is preferably directed by a beam deflector, preferably in a meander pattern over or through the sample.

In a particular embodiment of the invention, already excited sample areas are further excited by stimulation by the stimulation light beam into a third excitation state. This variant is also suitable for achieving high local resolution.

Preferably, the pulsing of the first illumination light beam and/or the second illumination light beam is timed. For this purpose, at least one pulsed light source such as a modem-coupled pulse laser (e.g., a titanium sapphire laser) may, for example, be provided. The use of pulsed semiconductor lasers or of regenerative amplifiers is also possible.

An embodiment of the invention in which the first illumination light beam and the second illumination light beam are temporally pulsed is of particular advantage, whereby the temporal interval of the pulses of the first illumination light beam to the pulses of the second illumination light beam is adjustable. In this variant, to light sources, for example, may be synchronized to each other, whereby the temporal interval between pulses may be adjusted by adjustable delay loops. In another variant, the light of the first illumination light beam and the light of the second illumination light beam may originate from a single light source that emits a splittable primary light beam, which may be implemented such that a change in wavelength (OPO, micro-structured fiber, frequency multiplication) or a change in power (e.g., amplifier or reducer) occurs in the split light branches.

The microscope according to the invention preferably exhibits at least one multilinear light source and/or at least one broadband light source. Preferably, the wavelength(s) of the first illumination light beam and/or of the second illumination light beam is/are adjustable. It is possible, according to the invention, that the first illumination light beam as well as the second illumination light beam comprise one or several wavelengths, whereby the wavelengths of the first illumination light beam and of the second illumination light beam may differ from each other.

In a particularly preferred variant, the diameter of the first illumination light beam and/or of the second illumination light beam is adjustable. It is of particular advantage if the aperture angle of the illumination light beam that converges on a focus that lies in the objective pupil is adjustable. Changing the aperture angle while focusing in the objective pupil changes the size of the surface that is evanescently illuminated. If one selects the surface that is to be evanescently illuminated by the stimulation light beam such that it is smaller than the surface that is evanescently excited by the illumination light beam, one can directly compare the fluorescent properties of sample layers that are in immediate proximity to the sample holder with the fluorescent properties of sample layers that are located in deeper-lying layers.

In a preferred variant, the sample is illuminated with an evanescent excitation illumination beam at a relatively high penetration depth. Fluorescence is directly de-excited at the sample holder by stimulation with evanescent STED illumination (stimulation light beam), which exhibits low penetration depth. Capturing the fluorescence image is done later (time-gated CCD) such that only fluorescence photons from deeper-lying sample layers are detected. Each of the depths is adjustable in that the radial positions of both illumination light focuses in the objective pupil are varied. In TIRF, the intensity of the illumination light in the sample decreases exponentially with penetration depth. The STED effect is all the more effective directly at the sample holder surface, such that, for example, sample layers greater than 100 nm in depth may be measured.

Preferably, bandpass filters and/or edge filters, to which each emission bandwidth of the fluorescence signal is attuned, are arranged before the detector (e.g., multiband detector), which may, for example, be implemented as a camera. A dispersive element that produces spectral splitting may be provided by which the parts of the wavelength that are to be detected can be blocked. The detector may also be implemented as a color detector, for example, as a color camera. It is also possible for a dispersive element to split the detection light among several detectors to achieve spectral detection.

In a very particularly preferred embodiment, the microscope comprises a scanning microscope, in particular, a confocal scanning microscope.

BRIEF DESCRIPTION OF THE DRAWINGS

The object of the invention is schematically represented in the diagram, and is described below on the basis of figures, wherein elements that have the same function are given the same reference numbers. They show.

DETAILED DESCRIPTION OF THE PREFERRED EMBODIMENTS

Figure 1:
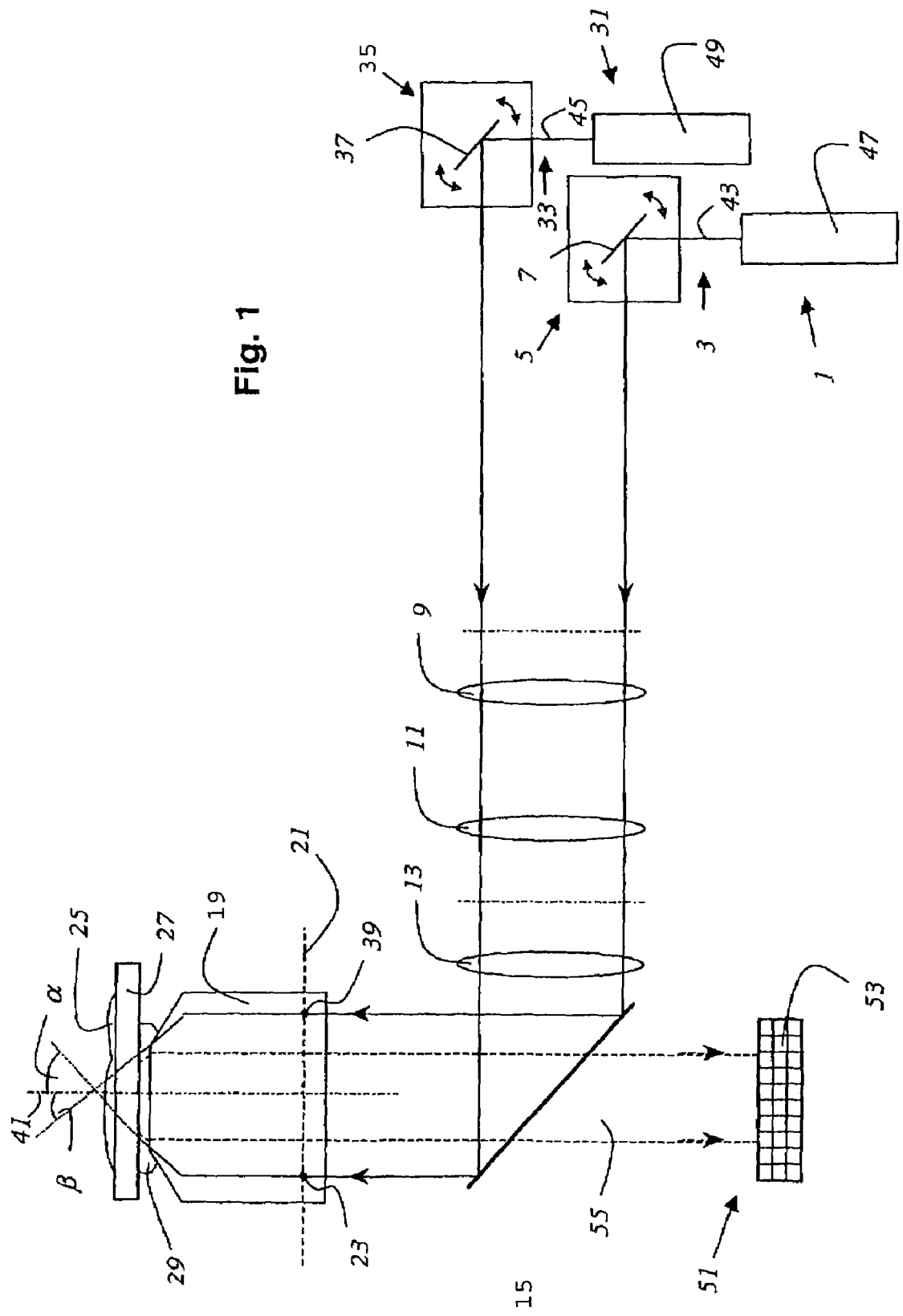
FIG. 1 a microscope according to the invention.

FIG. 1 shows a microscope according to the invention with a first light source 1 that produces a first illumination light beam 3. The first illumination light beam reaches a first beam deflector 5 that comprises a cardanically suspended rotating mirror 7 and is directed by the aforementioned beam deflector to a first optic 9, a second optic 11, and a third optic 13, and is deflected by a beam splitter 15, which is implemented as a dichroic beam splitter 17, to a microscope objective 19. The microscope objective 19 exhibits a rear focal plane (objective pupil plane 21). The first illumination light beam 3 exhibits a focus 23, which is indicated by a point, in the objective pupil plane 21. The illumination light beam 3 is coupled in a sample holder 27 for the purpose of evanescent illumination of the sample 25. An immersion medium 29 is located between the sample holder and the objective 19. The microscope exhibits a second light source 31, which emits a second illumination light beam 33. The second illumination light beam reaches the first optic 9, the second optic 11, and the third optic 13 via a second beam deflector 35, which comprises a second cardanically suspended rotating mirror, and via the splitter 15 to the microscope objective 19. The second illumination light beam 33 exhibits a focus 39 in the objective pupil plane. The second illumination light beam 33 is also coupled in the sample holder 27 for the purpose of evanescent sample in illumination. The first illumination light beam exits the microscope objective 19 at an angle α to the optical axis 41 of the objective, while the second illumination light beam 33 exits the objective 19 at an angle β. Angle α may be adjusted by changing the distance of the first focus 23 of the first illumination light beam 3 to the optical axis 41 of the objective 19. Analogously, angle β is adjustable by changing the distance of the second focus 39 to the optical axis 41. The position of the first focus 23 and of the second focus 39 may be adjusted with the help of the first beam splitter 5 or with the help of the second beam splitter 35, respectively, which are each preferably arranged in a plane that corresponds to the objective pupil plane 21. Because the penetration depth of the evanescent illumination is directly dependent on angle α and angle β, respectively, the penetration depth of the first illumination light beam 3 and of the second illumination light beam 33 may be adjusted with the help of the first beam splitter 5 and with the help of the second beam splitter 35, respectively.

In this embodiment of the invention, the first illumination light beam 3 is an excitation light beam 43, whereas the second illumination light beam 33 is a stimulation light beam 45. The excitation light beam 43 excites a first layered sample area of the sample 25. The stimulation light beam 45 exhibits light at a wavelength that is suitable for triggering stimulated emission of excited sample molecules. The penetration depth of the evanescent stimulation illumination light beam is less in this variant than is the penetration depth of the evanescent excitation light beam. The first light source 1 is implemented as a pulsed titanium sapphire laser 47. The second light source 31 is also pulsed and comprises a titanium sapphire laser, which is not shown, which supplies the OPO (optical parametric oscillator), which is not shown. The first light source 1 and the second light source 31 are synchronized to each other such that a pulse of the excitation light beam 3 triggers sample excitation, and a stimulated emission is then triggered by the light of the stimulation light beam 31 in a sample layer that overlaps with the excitation layer. Finally, the fluorescence photons that come from the excitation area of the excitation light beam 3 that is not struck by the light of the stimulation light beam 31 are detected by the detector 51, which may be implemented as a CCD camera 53. The detection light 55, which comes from this area, reaches the beam splitter 15 via the microscope objective 19, passes the beam splitter 15, and then reaches the CCD camera 53.

Figure 2:
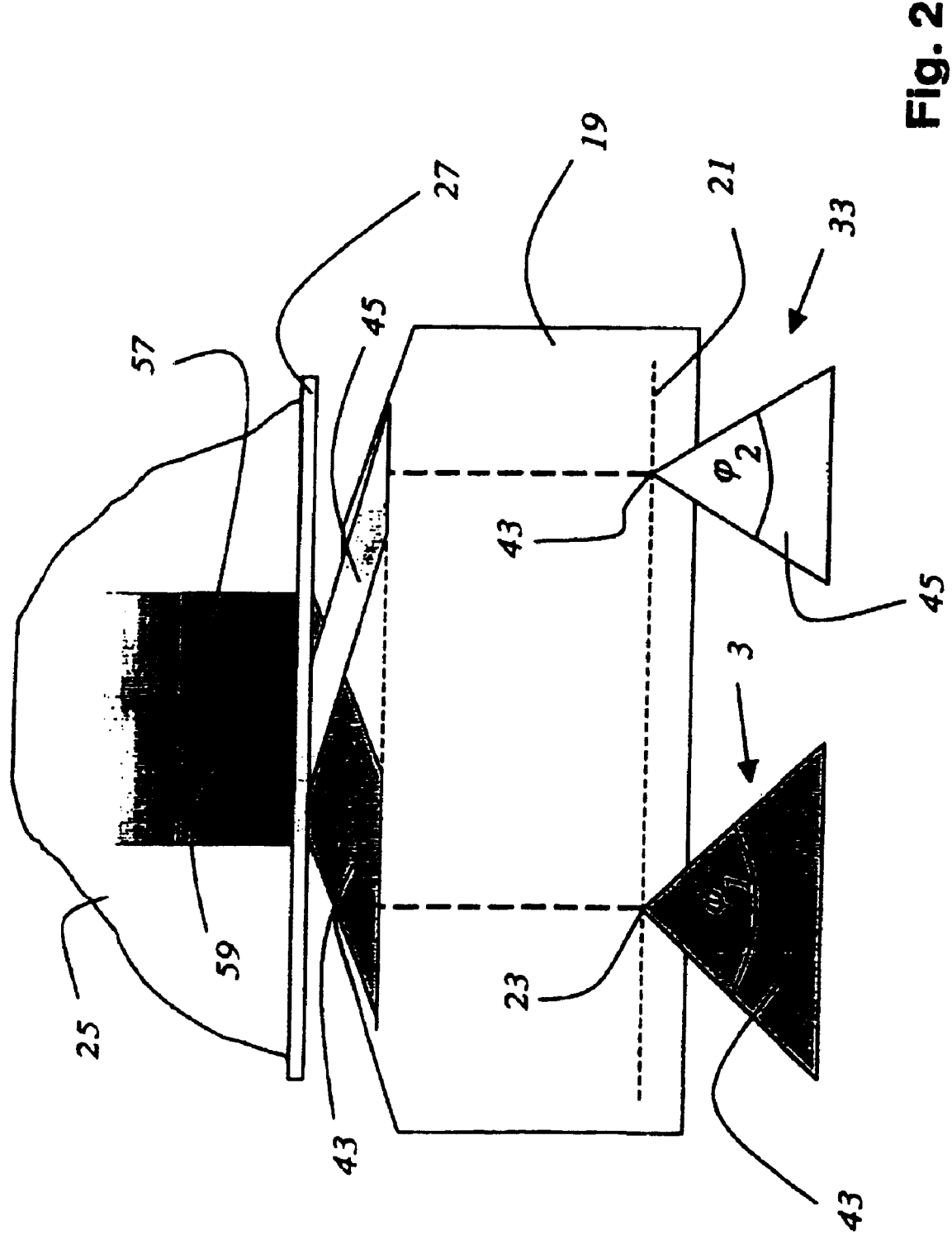
FIG. 2 a detail view of a microscope according to the invention to explain a method according to the invention.

FIG. 2 shows a detail view of a microscope according to the invention for implementing the method according to the invention. A first illumination light beam 3, which is an excitation light beam 43, is focused on a first focus 23. After passing through the microscope objective 19 (indicated by broken lines) the excitation light beam exits the objective as parallel light beams, and is coupled in a sample holder 27 for the purpose of evanescent sample illumination. A second illumination light beam 33, which is a stimulation light beam 45, is focused on a second focus 39 in the objective pupil plane 21. After passing through the objective 19 (indicated by broken lines), the stimulation light beam 45 exits as parallel light beams. The excitation light beam 43 exits the objective 19 at an angle to the optical axis of the objective that is greater than that of the stimulation light beam 45; accordingly, the penetration depth of the light of the excitation light beam 43 in the sample 25 is greater than the penetration depth of the light of the stimulation light beam 45. The light cone that converges to a first focus 23 of the excitation light beam 43 exhibits an aperture angle $\phi_1$, whereas the light cone of the stimulation light beam 45 that converges to a second focus 39 exhibits an aperture angle $\phi_2$, which is smaller than $\phi_1$; consequently, the diameter of the excitation light beam that exits objective 19 is greater than the diameter of the stimulation light beam 45 that exits the objective 19. Accordingly, the axial surface 25 of the sample that is evanescently illuminated by the excitation light beam 43 is greater than the surface of the sample that is evanescently illuminated by the stimulation light beam 45. This arrangement makes it possible to compare the fluorescence properties of sample layers that are in immediate proximity to the sample holder 27 as well as to layers that lie deeper. The first sample area 57 that is evanescently illuminated by the excitation light beam 43 is optically excited by the light of the excitation light beam 43 (indicated by hatched lines). The second sample area 59 that is evanescently illuminated by the stimulation light beam 45 is smaller than the first sample area 57 and overlaps at least partially with same. A stimulated emission is triggered in this second sample area 59, and only thereafter are the spontaneously emitted photons detected by the (gated) detector, which is not shown. The detected photons largely originate from the part of the first sample area 57 that does not overlap with the second sample area 59.

The invention was described in relation to a particular embodiment. However, it is clear that changes and variations may be implemented without abandoning the scope of the following claims.

What is claimed is:

1. A microscope comprising:
    an objective with an objective pupil plane and an objective optical axis;
    an excitation light beam with a focus in the objective pupil plane; and
    a stimulation light beam with a focus in the objective pupil plane;
    wherein the excitation beam excites a first sample area;
    wherein the stimulation beam generates a stimulated emission or further excitation in a second sample area;
    wherein the second sample area at least partially overlaps with the first sample area; and
    wherein the distance between the focus of the excitation light beam and the optical axis of the objective is greater than the distance of the focus of the stimulation light beam to the optical axis.

2. The microscope according to claim 1, further comprising an adjustment mechanism for adjusting a position of the focus of the excitation beam or of the stimulation beam within the objective pupil plane.

3. The microscope according to claim 2, wherein the adjustment mechanism comprises an adjustable beam deflector in a beam path of the excitation beam or of the stimulation light beam.

4. The microscope according to claim 1, wherein the distance between the focus of the excitation beam or of the stimulation beam and the optical axis of the objective is adjustable to adjust a penetration depth of evanescent illumination in the sample generated by the excitation beam or by the stimulation beam.

5. The microscope according to claim 1, wherein the excitation beam and the stimulation beam generate evanescent illumination in the sample, and wherein the evanescent illumination generated by the excitation beam has a greater penetration depth in the sample than the evanescent illumination generated by the stimulation beam.

6. The microscope according to claim 1, wherein the excitation beam and/or the stimulation beam is/are temporally pulsed.

7. The microscope according to claim 6, wherein the excitation beam and the stimulation beam are temporally pulsed, and wherein a temporal interval between the pulses of the excitation beam and the pulses of the stimulation beam is adjustable.

8. The microscope according to claim 1, wherein a diameter of the excitation beam and/or of the stimulation beam is adjustable.

9. The microscope according to claim 1, further comprising a multilinear light source for one of the two beams and/or a broadband light source for one of the two beams, wherein a wavelength of the excitation beam and/or a wavelength of the stimulation beam is/are adjustable.

10. The microscope according to claim 1, wherein the microscope is a scanning microscope.

11. A method for microscopic testing of a sample, comprising the following steps:
  generating an excitation light beam;
  generating a stimulation light beam;
  generating with the excitation beam an evanescent illumination in the sample exciting a first sample area; and
  generating with the stimulation beam an evanescent illumination in the sample to generate a stimulated emission or further excitation in a second sample area;
  wherein the second sample area at least partially overlaps with the first sample area;
  wherein the excitation beam has a focus in an objective pupil plane of an objective;
  wherein the stimulation beam has a focus in the objective pupil plane of the objective; and
  wherein the distance of the focus of the excitation light beam to an optical axis of the objective is greater than the distance of the focus of the stimulation light beam to the optical axis.

12. The method according to claim 11, further comprising:
  adjusting a position of the focus of the excitation and/or of the stimulation light beam within the objective pupil plane by an adjustment mechanism.

13. The method according to claim 12, wherein the adjustment mechanism comprises an adjustable beam deflector in the beam path of the excitation beam or of the stimulation light beam.

14. The method according to claim 11, further comprising:
  adjusting a penetration depth of evanescent illumination generated by the excitation beam or by the stimulation beam in the sample by adjusting a distance of the focus of the excitation beam or of the stimulation beam from the optical axis of the objective.

15. The method according to claim 11, wherein the evanescent illumination generated by the excitation beam has a greater penetration depth in the sample than the evanescent illumination generated by the stimulation beam.

16. The method according to claim 11, wherein the excitation beam and/or the stimulation beam is/are temporally pulsed.

17. The method according to claim 16, wherein the excitation beam and the stimulation beam are temporally pulsed, and wherein a temporal interval between the pulses of the excitation beam and the pulses of the stimulation beam is adjustable.

18. The method according to claim 11, wherein a diameter of the excitation beam and/or of the stimulation beam is adjustable.

19. The method according to claim 11, further comprising adjusting a wavelength of the excitation beam and/or a wavelength of the stimulation beam.

20. The method according to claim 11, wherein the microscope is a scanning microscope.

* * * * *